(12) United States Patent
Yamaguchi et al.

(10) Patent No.: US 11,285,071 B2
(45) Date of Patent: Mar. 29, 2022

(54) MOVEMENT INDUCING DEVICE

(71) Applicant: AISIN SEIKI KABUSHIKI KAISHA, Kariya (JP)

(72) Inventors: Hideaki Yamaguchi, Okazaki (JP); Takayuki Kodama, Otsu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 647 days.

(21) Appl. No.: 16/078,584

(22) PCT Filed: Mar. 22, 2017

(86) PCT No.: PCT/JP2017/011556
§ 371 (c)(1),
(2) Date: Aug. 21, 2018

(87) PCT Pub. No.: WO2017/164261
PCT Pub. Date: Sep. 28, 2017

(65) Prior Publication Data
US 2019/0053972 A1 Feb. 21, 2019

(30) Foreign Application Priority Data
Mar. 24, 2016 (JP) .............................. JP2016-060198

(51) Int. Cl.
*A61H 9/00* (2006.01)
*A63B 23/00* (2006.01)
(Continued)

(52) U.S. Cl.
CPC ............ *A61H 9/0078* (2013.01); *A61H 7/00* (2013.01); *A63B 21/008* (2013.01); *A63B 23/00* (2013.01);
(Continued)

(58) Field of Classification Search
CPC .... A61H 9/0078; A61H 9/0092; A61H 7/004; A61H 15/0078; A61H 2201/0149; A61H 2201/0138; A47C 4/54
See application file for complete search history.

(56) References Cited

U.S. PATENT DOCUMENTS 3,037,499 A 6/1962 Cummins
3,613,671 A * 10/1971 Poor ...................... B60N 2/976
601/149

(Continued)

FOREIGN PATENT DOCUMENTS

JP 63-234986 A 9/1988
JP 2001-199296 A 7/2001
(Continued)

OTHER PUBLICATIONS

Combined Chinese Office Action and Search Report dated Oct. 8, 2019 in Chinese Patent Application No. 201580075762.0 (with partial unedited computer generated English translation and English translation of Categories of Cited Documents), 26 pages.
(Continued)

*Primary Examiner* — Samchuan C Yao
*Assistant Examiner* — Nathan M Le
(74) *Attorney, Agent, or Firm* — Oblon, McClelland, Maier & Neustadt, L.L.P.

(57) ABSTRACT

The movement inducing device includes a plurality of air bags, each being provided with a contacting portion configured to contact with a user and induce a movement of an intended skeletal muscle of the user; a drive mechanism configured to expand and compress the air bags by adjusting supply and discharge of air to and from each air bag and a control unit provided with a drive control unit configured to control driving of the drive mechanism to make the intended skeletal muscle of the user perform at least one of an isotonic
(Continued)

muscle activity, an isometric muscle activity and an isokinetic muscle activity.

10 Claims, 13 Drawing Sheets

(51) Int. Cl.
    *B60N 2/66*           (2006.01)
    *A63B 21/008*       (2006.01)
    *A61H 7/00*          (2006.01)
    *B60N 2/879*        (2018.01)
    *B60N 2/90*          (2018.01)
    *B60N 2/885*        (2018.01)

(52) U.S. Cl.
    CPC .............. *B60N 2/665* (2015.04); *B60N 2/879* (2018.02); *B60N 2/885* (2018.02); *B60N 2/914* (2018.02); *B60N 2/986* (2018.02); *A61H 2201/0149* (2013.01); *A61H 2201/1238* (2013.01); *A61H 2201/1261* (2013.01); *A61H 2201/1604* (2013.01); *A61H 2201/1623* (2013.01); *A61H 2201/5007* (2013.01); *A61H 2201/5035* (2013.01); *A61H 2201/5056* (2013.01); *A61H 2201/5071* (2013.01); *A61H 2201/5087* (2013.01); *A61H 2205/02* (2013.01); *A61H 2205/081* (2013.01); *A61H 2205/106* (2013.01); *A61H 2205/108* (2013.01); *A61H 2205/12* (2013.01)

(56) References Cited

U.S. PATENT DOCUMENTS

| | | | |
|---|---|---|---|
| 4,869,497 A | | 9/1989 | Stewart et al. |
| 5,135,282 A | * | 8/1992 | Pappers ................. B60N 2/914 297/284.3 |
| 5,792,082 A | | 8/1998 | Yamanaka et al. |
| 6,592,533 B1 | * | 7/2003 | Yonekawa ............... A47C 4/54 601/148 |
| 6,676,615 B2 | | 1/2004 | Flick et al. |
| 7,093,898 B2 | * | 8/2006 | Ladron De Guevara .................... A47C 4/54 297/284.6 |
| 7,311,681 B1 | | 12/2007 | Vaccarella |
| 8,041,484 B2 | | 10/2011 | Imai et al. |
| 2004/0201481 A1 | | 10/2004 | Yoshinori et al. |
| 2006/0217645 A1 | * | 9/2006 | Lockamy ................ A61G 15/10 601/148 |
| 2008/0051683 A1 | * | 2/2008 | Tanizawa ............... A61H 15/00 601/86 |
| 2009/0099490 A1 | * | 4/2009 | Durt ........................ B60N 2/986 601/115 |
| 2010/0198120 A1 | * | 8/2010 | Tago .................... A61H 1/0292 601/134 |
| 2012/0040799 A1 | | 2/2012 | Jaquish et al. |
| 2013/0210582 A1 | | 8/2013 | Del Toro et al. |
| 2014/0025258 A1 | * | 1/2014 | Lem ........................ B60N 2/976 701/36 |
| 2014/0207333 A1 | * | 7/2014 | Vandivier .............. B60N 2/976 701/36 |
| 2015/0008710 A1 | * | 1/2015 | Young .................... B60N 2/976 297/217.3 |
| 2015/0126916 A1 | * | 5/2015 | Hall ......................... B60N 2/42 601/149 |

FOREIGN PATENT DOCUMENTS

| | | |
|---|---|---|
| JP | 2004-284449 A | 10/2004 |
| JP | 2007-75257 A | 3/2007 |
| JP | 2008-77631 A | 4/2008 |
| JP | 2009-34455 A | 2/2009 |
| JP | 2010-75312 A | 4/2010 |
| JP | 4670411 B2 | 4/2011 |
| JP | 2013-17637 A | 1/2013 |
| JP | 2013-538640 A | 10/2013 |
| JP | 2014-512231 A | 5/2014 |
| JP | 2016-10669 A | 1/2016 |

OTHER PUBLICATIONS

International Search Report dated May 16, 2017 in PCT/JP2017/011556 filed Mar. 22, 2017.

U.S. Office Action dated May 17, 2018 in U.S. Appl. No. 15/552,369, filed Aug. 21, 2017, 9 pages.

* cited by examiner

MOVEMENT INDUCING DEVICE

TECHNICAL FILED

This invention relates to a movement inducing device.

BACKGROUND ART

As one type of movement inducing devices, a movement inducing device disclosed in Patent Literature 1 has been known. As shown in FIG. 8 of Patent Literature 1, in the movement inducing device, a buttocks support portion 13 performs a rocking movement in a front/rearward direction and a right/left direction by a rocking drive device 12. The rocking movement device 12 is connected to a footrest device 20 via an extendable connecting mechanism 19. A footrest portion 21 which constitutes the footrest device 20 is provided to be slidably movable in a front/rear direction and is biased rearward by a coil spring 23 having a biasing force necessary for returning the footrest portion 21 which has been forwardly slid by the foot from the slid position to the original position. The motion inducing device thus configured enables more suitable or appropriate exercise for the leg portion.

Further, as another type of the movement inducing devices, a movement inducing device disclosed in Patent Literature 2 has been known. As shown in FIGS. 1 and 2 of the Patent Literature 2, the movement inducing device includes an extendable air bag 15, a detecting portion 16 which detects the pressure of gas in the closed passage to which the air bag 15 is connected, a monitor 29 which displays the detected pressure detected by the detecting portion 16 and a control portion 26 which makes the monitor 29 display a computer graphics which changes in response to the change of the detected pressure detected by the detecting portion 16, and the movement inducing device is characterized in that the computer graphics displayed on the monitor 29 is changed when the detected pressure detected by the detecting portion 16 is changed by compressing the air bag 15. The movement inducing device thus configured enables enjoyable muscle training.

RELATED ART LITERATURE

Patent Literature

Patent Literature 1 JP-A-2013-017637
Patent Literature 2 JP-A-2008-307321

SUMMARY OF INVENTION

Technical Problem(S)

According to the movement inducing device disclosed in Patent Literature 1, the type of movements inducible by a user is limited and the size of the device becomes large and the manufacturing cost becomes high.

Further, according to the movement inducing device disclosed in Patent Literature 2, although the device uses an air bag, an issue has been raised in which the convenience for use and operability in use are poor such that the movement in skeletal muscle targeted by the user cannot be properly induced.

The present invention has been made to eliminate the aforementioned problem and the objective of the invention is to provide a movement inducing device with small size and low cost and at the same time with favorable user convenience and operability.

Solution to Problem(S)

In order to solve the above problem(s), the movement inducing device according to claim 1 includes a plurality of air bags each being provided with a contacting portion configured to contact with a user and induce a movement of an intended skeletal muscle of the user, a drive mechanism configured to expand and compress the air bags by adjusting a supply and a discharge of air to and from each air bag and a control unit provided with a drive control unit configured to control driving of the drive mechanism to make the intended skeletal muscle of the user perform at least one of an isotonic muscle activity, an isometric muscle activity and an isokinetic muscle activity.

Effect of the Invention

According to such a configuration, the drive control unit controls driving of the drive mechanism to control each contacting portion of the air bags thereby making the intended skeletal muscle of the user perform at least one of the isotonic muscle activity, the isometric muscle activity and the isokinetic muscle activity. In this way, a movement of the skeletal muscle intended by the user can be properly induced by controlling the air bags with a relatively simple structure. Thus, it is possible to provide a movement inducing device with small size and low cost and with favorable user convenience and operability.

MODE(S) FOR CARRYING OUT THE INVENTION

First Embodiment

Figure 1:
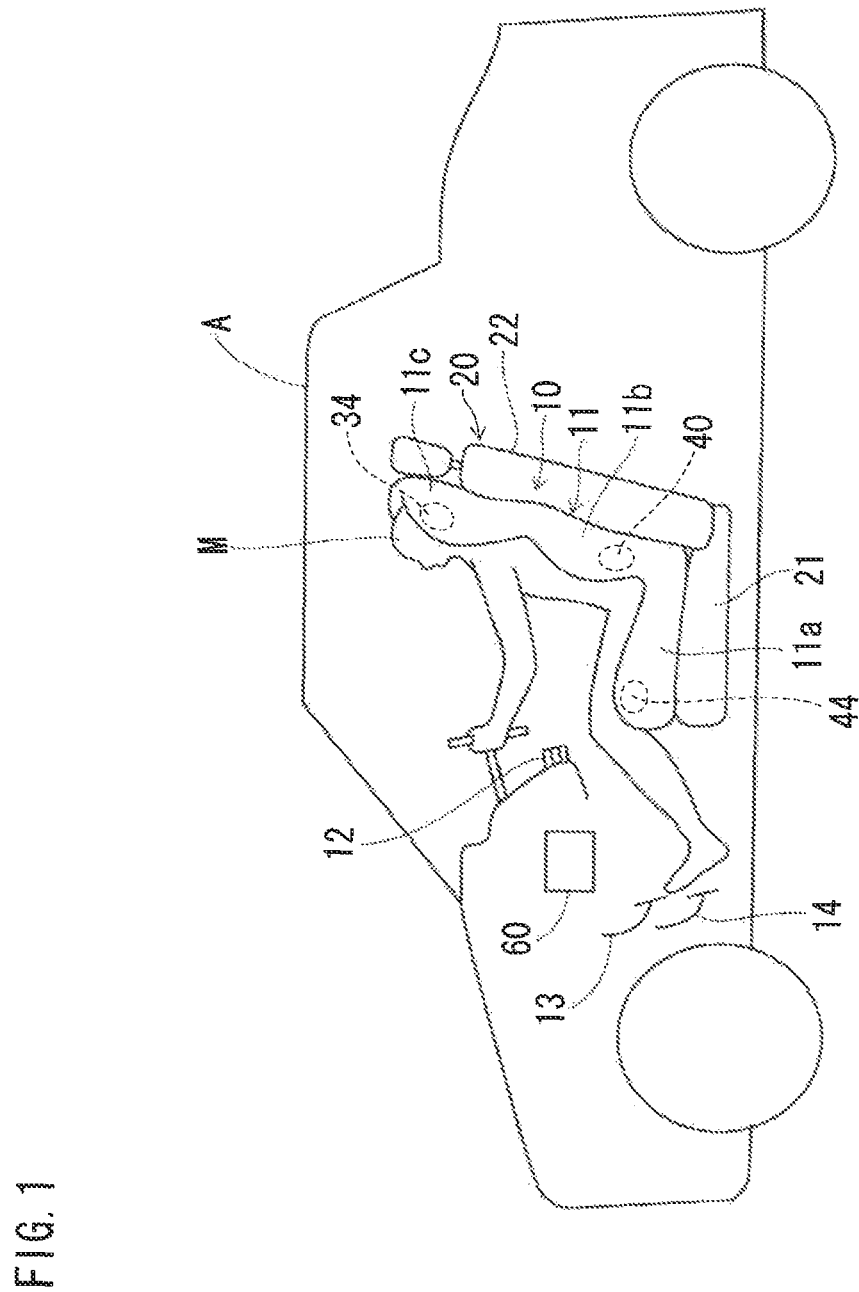
FIG. 1 is a schematic view showing a concept of a first embodiment of a movement inducing device according to the present invention.

Hereinafter, a first embodiment of a movement inducing device according to the present invention will be explained. As shown in FIG. 1, a movement inducing device 10 is installed on a vehicle A. The movement inducing device 10 is provided at a vehicle seat 20 that is a driver's seat of the vehicle A. The vehicle seat 20 is a chair on which a driver M sits as a user. The vehicle seat 20 is formed by a seat cushion 21 and a seat back 22.

Figure 2:
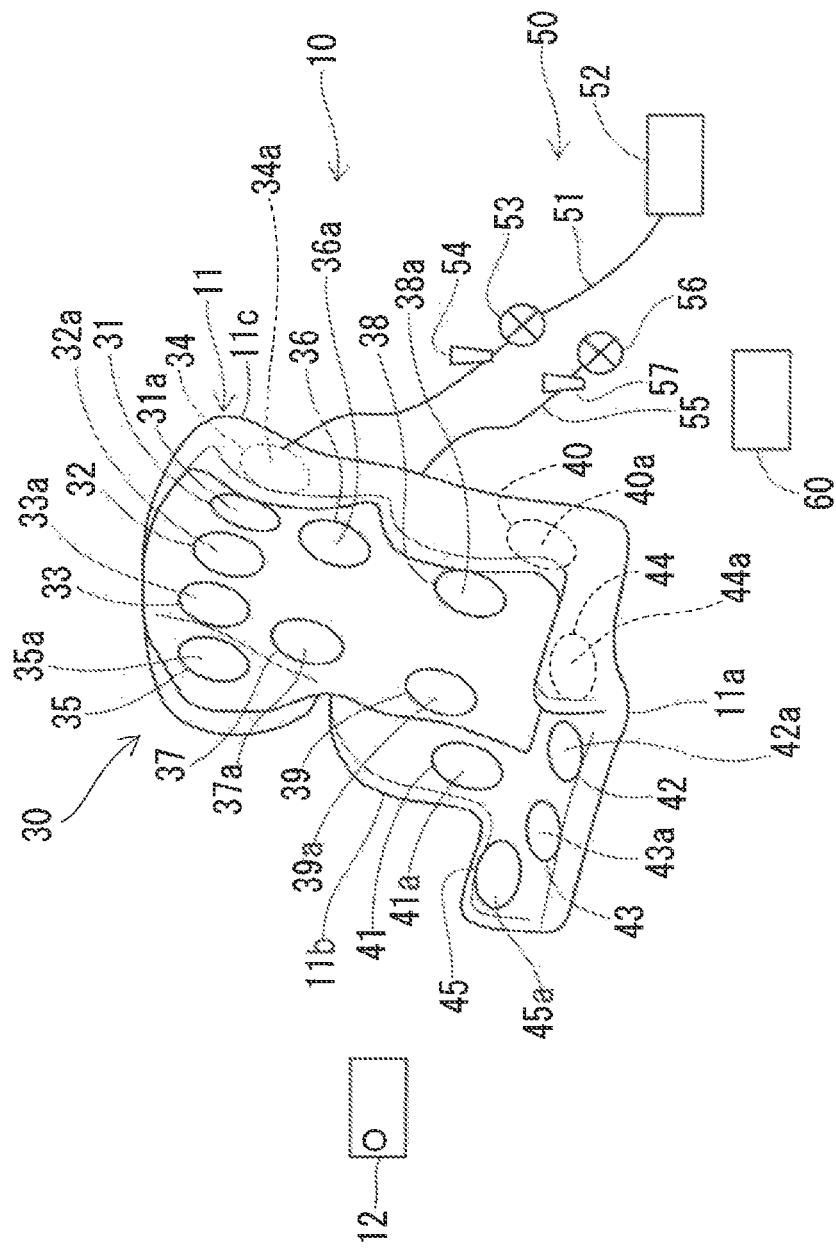
FIG. 2 is a schematic perspective view showing the movement inducing device indicated in FIG. 1.

The movement inducing device 10 includes, as shown in FIGS. 1 and 2, a main body 11, an air bag group 30 formed by a plurality of air bags provided on the main body 11, a drive mechanism 50 for adjusting supply and discharge of the air to and from the air bag group 30, and a control unit 60 for controlling the drive mechanism 50.

It is noted here that the movement inducing device 10 may be installed on a vehicle side (for example, at the vehicle seat 20 or a vehicle body frame, etc.) as shown in FIG. 1.

The main body 11 is formed separately from the vehicle seat 20, and can be detachably assembled with the vehicle seat 20. The main body 11 is formed in shape of a bucket seat for the driver M to be seated therein. The bucket seat is shaped such that the heights of the right and left ends thereof are formed extremely high compared to a normal type of vehicle seat so as to deeply embrace the hip and shoulder of the driver M. The main body 11 is structured to cover or shroud the head, sides, waist, and thighs of the body side of the driver M (user). The main body 11 includes a seat part 11a, a backrest part 11b and a headrest part 11c.

The air bag group 30 is formed by a plurality of air bags 31 through 45. The plurality of air bags 31 through 45 is provided between the vehicle seat 20 on which the driver M sits and the driver M. As shown in FIG. 2, the plurality of air bags 31 through 45 is provided on the surface of the main body 11. The air bags 31 to 35 are provided on the headrest part 11c. The air bags 31 to 33 are provided on the backrest face of the headrest part 11c, and the air bags 34 and 35 are provided on the side of the headrest part 11c.

The air bags 31 to 33 are provided with contacting portions 31a to 33a respectively, each contacting the back of the driver M's head. The air bags 34 and 35 are provided with contacting portion 34a and 35a respectively, each contacting the temporal region of the driver M's head. The contacting portions 31a to 35a serve as a contacting portion respectively for inducing the movement of an intended skeletal muscle of the driver M, i.e. *musculus* trapezius.

Figure 3:
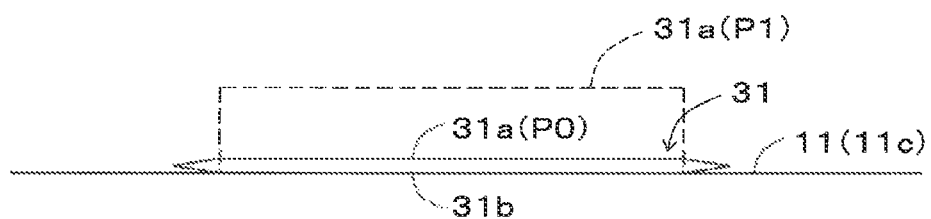
FIG. 3 is a view showing the state of an air bag indicated in FIG. 2 being expanded and compressed.

The contacting portion 31a is, as shown in FIG. 3, movable from an initial position P0 to a first position P1 by performing supply and discharge of the air to and from the air bag 31. It is noted here that the other contacting portions 32a to 35a (including contacting portions 36a to 45a to be described later) are also movable from the initial position P0 to the first position P1 in the same way as the movement of the contacting portion 31a.

It is also noted that the air bag 31 is provided with a fixing portion 31b that is fixed on the surface of the main body 11.

The air bags 36 and 37 are, as shown in FIG. 2, provided on the upper part of the backrest part 11b. The air bags 36 and 37 are provided on the backrest face of the backrest part 11b. The air bags 36 and 37 are provided with contacting portions 36a and 37a respectively, which are contactable with the right and left upper arms of the driver M. The contacting portions 36a and 37 serve as a contacting portion respectively for inducing a movement of the intended skeletal muscle of the driver M, i.e. *musculus* latissimus dorsi.

The air bags 38 and 39 are provided on the lower part of the backrest part 11b. The air bags 38 and 39 are provided on the backrest face of the backrest part 11b. The air bags 38 and 39 are provided with contacting portions 38a and 39a respectively, which are contactable with the right and left sides of the waist of the driver M. The contacting portions 38a and 39a serve as a contacting portion respectively for inducing a movement of the intended skeletal muscle of the driver M, i.e. *musculus* erector spinae.

The air bags 40 and 41 are provided on the lower part of the backrest part 11b. The air bags 40 and 41 are provided on the side of the backrest part 11b. The air bags 40 and 41 are provided with contacting portions 40a and 41a respectively, which are contactable with the right side and the left side of the hips of the driver M. The contacting portions 40a and 41a serve as a contacting portion respectively for inducing a movement of the intended skeletal muscle of the driver M, i.e. *musculus* erector spinae.

The air bags 42 and 43 are provided on the front end portions of the seat part 11a. The air bags 42 and 43 are provided on the seating face of the seat part 11a. The air bags 42 and 43 are provided with contacting portions 42a and 43a respectively, which are contactable with the right and left side of the back of the thighs of the driver M. The contacting portions 42a and 43a serve as a contacting portion respectively for inducing the movement of the intended skeletal muscle of the driver M, i.e. *musculus* gluteus maximus/hamstrings.

The air bags 44 and 45 are provided on the front end portions of the seat part 11a. The air bags 44 and 45 are provided in the both sides of the seat part 11a. The air bags 44 and 45 are provided with contacting portions 44a and 45a respectively, which are contactable with sides of the right and left thighs of the driver M. The contacting portions 44a and 45a serve as a contacting portion respectively for inducing a movement of the intended skeletal muscle of the driver M, i.e. *musculus* gluteus medius.

Among the contacting portions 31a to 45a described in the present specification, the contacting portions 36a, 37a, 44a and 45a for inducing movements of *musculus* gluteus medius and *musculus* latissimus dorsi, are categorized as a first contacting portion A1. The first contacting portion A1 induces the movements of gluteus medius muscles and latissimus dorsi muscles, and thus the user M performs the induced movements to thereby eliminate his/her drowsiness.

Among the contacting portions 31a to 45a described in this specification, the contacting portions 31a to 35a, 38a, 39a, 40a, 41a. 42a and 43a for inducing movements of *musculus* trapezius, *musculus* erector spinae, and *musculus* gluteus maximus/hamstrings are categorized as a second contacting portion A2. The second contacting portion A2 induces the movement of *musculus* trapezius, *musculus* erector spinae, and *musculus* gluteus maximus/hamstrings, and thus the user M performs the induced movements to thereby relieve (eliminated) his/her fatigue.

The drive mechanism 50 adjusts supply and discharge of the air to and from each of the air bags 31 through 45, so that the corresponding contacting portions 31a to 45a can be moved to the driver M side or to the side opposite to the driver M, and/or the reaction force reacting against the pressing force of the driver M on each of the contacting portions 31a to 45a can be adjusted. Specifically, as shown in FIG. 2, the drive mechanism 50 includes an air supply passage 51 one end of which is connected to each of the air bags 31 through 45 to supply air to the air bags 31 through 45, an air feeder 52 (for example, an air compressor) to which the other end of the air supply passage 51 is connected to supply air, an air supply valve 53 provided at the air supply passage 51 to serve as a solenoid opening/closing valve for opening/closing the air supply passage 51, a pressure sensor 54 provided at the air supply passage 51 to detect the pressure in the air supply passage 51, an air discharge passage 55 one end of which is connected to each of the air bags 31 through 45, and the other end of which is open to the atmosphere to discharge the air of the air bags 31 through 45, an air discharge valve 56 provided at the air discharge passage 55 to serve as a solenoid opening/closing valve for opening/closing the air discharge passage 55, and a flow-rate sensor 57 provided at the air discharge passage 55 to detect the flow-rate of the air in the air discharge passage 55.

Although the air supply passage 51, the air supply valve 53, the pressure sensor 54, the air discharge passage 55, the air discharge valve 56, and the flow-rate sensor 57 are illustrated singly, respectively, in FIG. 2, it is practically preferred that these components are provided in number corresponding to the number of air bags 31 through 45. However, the number of the components may be set to less than the number of corresponding air bags 31 through 45 as appropriate. The air feeder 52 may be provided singly or in plural number.

Operations for expanding the air bags 31 through 45 will be described. The air bags 31 through 45 are in a compressed state, unless the air is supplied thereto and under such state, the contacting portions 31a to 45a are positioned at the initial position P0, as shown in FIG. 3. When the air bags 31 through 45 are supplied with air by the drive mechanism 50, the air bags 31 through 45 are expanded. Under the state that these air bags are expanded to the maximum, the contacting portions 31a to 45a are positioned at the first position P1.

To supply the air, the control unit 60 gives instructions so as to close the air discharge valve 56, open the air supply valve 53, and operate the air feeder 52. Then, the air bags 31 through 45 are supplied with air to thereby expand. Under such operation, the air to be supplied to each of the air bags 31 through 45 can be individually adjusted. The inner pressure of the air bags 31 through 45 is detected by the pressure sensor 54 and is transmitted to the control unit 60.

Accordingly, a desired expansion control for each air bag 31 through 45 can be performed by monitoring the degree of expansion (expansion speed) and the inner pressure.

Operations for compressing the air bags 31 through 45 will be described. When the air bags 31 through 45 have been expanded, the contacting portions 31a to 45a thereof are positioned, for example, at the first position P1, as shown in FIG. 3. When the air is discharged from the air bags 31 through 45 by the drive mechanism 50, the air bags 31 through 45 are compressed. When the air is thus discharged, the contacting portions 31a to 45a finally return to the initial position P0.

To discharge the air, the control unit 60 gives instructions to close the air supply valve 53 and open the air discharge valve 56. Then, the air is discharged from the air bags 31 through 45 to compress the air bags 31 through 45. Under such operation, the air to be discharged from each of the airbags 31 through 45 can be individually adjusted. The discharge rate is detected by the flow-rate sensor 57 and is transmitted to the control unit 60. The inner pressure of the air bags 31 through 45 is detected by the pressure sensor 54 and is transmitted to the control unit 60. Accordingly, a desired compression control for each air bag 31 through 45 can be performed by monitoring the degree of compression (compression speed) and the inner pressure.

The movement inducing device 10 is provided with an operation section 12. The operation section 12 includes a display section for displaying the state of the movement inducing device 10, a mode selection screen and an input section for inputting a mode desired by the user. Further, the vehicle A is equipped with an accelerator pedal 13 and a brake pedal 14.

Second Embodiment

Figure 4:
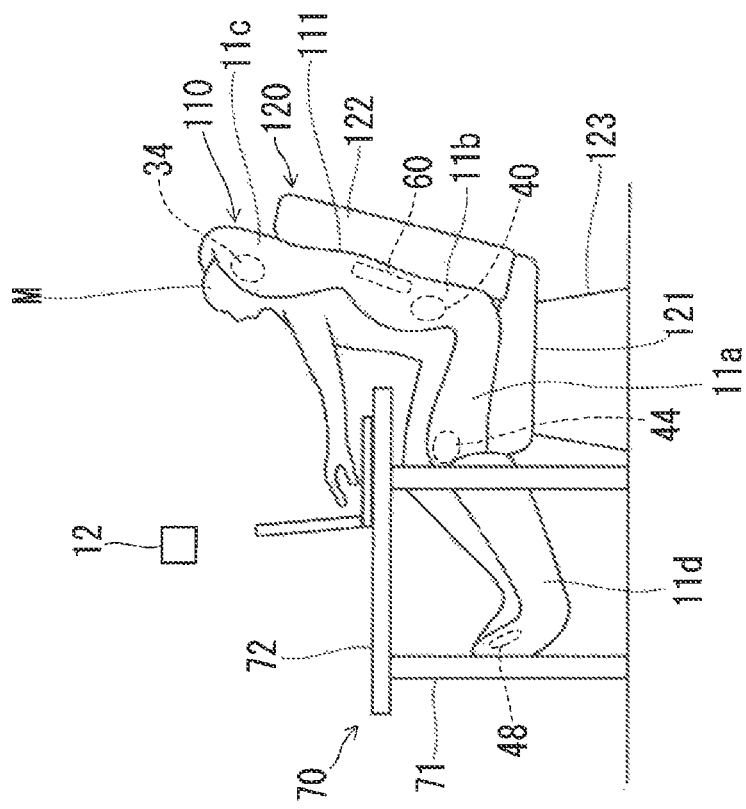
FIG. 4 is a schematic view showing a concept of a second embodiment of the movement inducing device according to the present invention.
Figure 5:
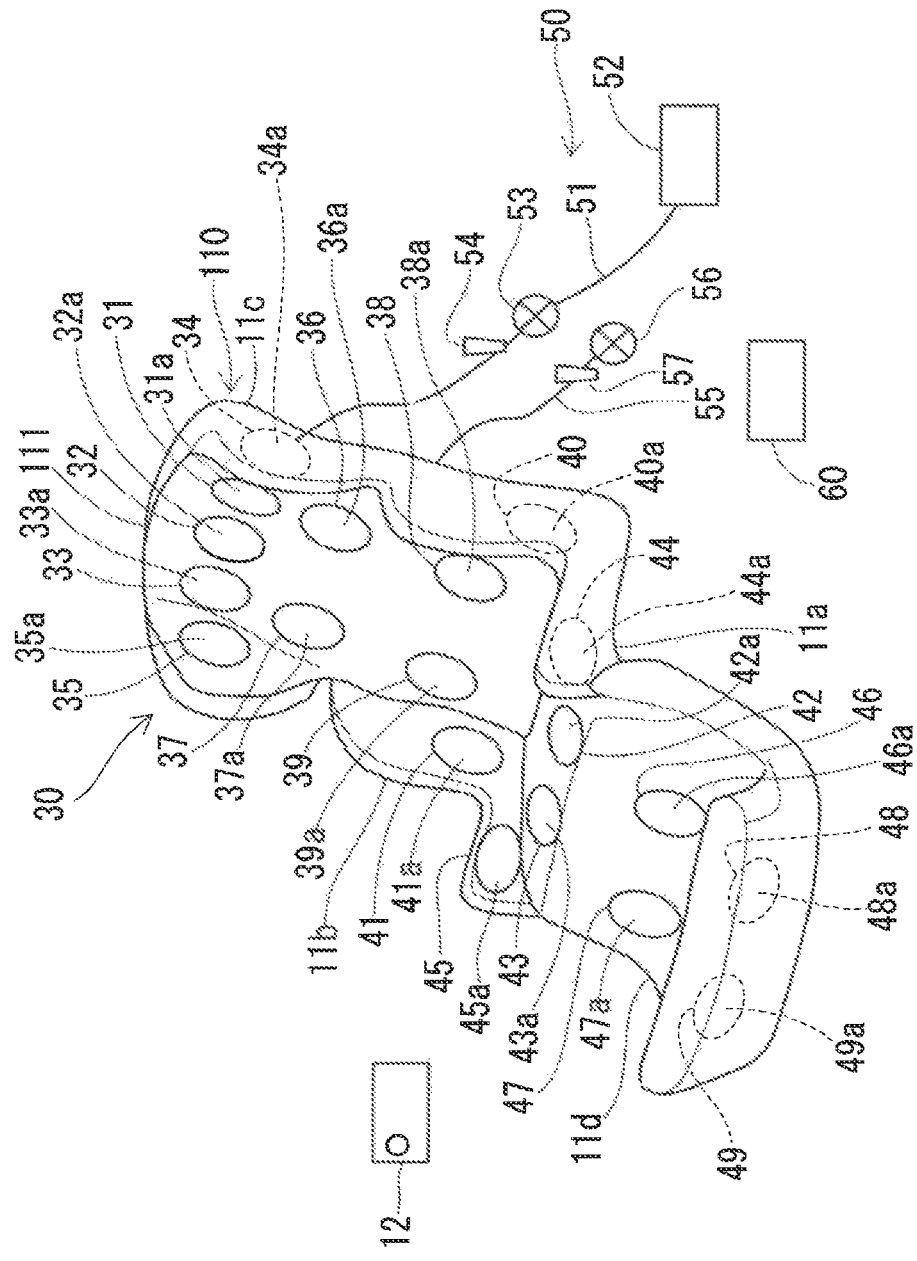
FIG. 5 is a schematic perspective view showing the movement inducing device indicated in FIG. 4.

Next, a second embodiment will be explained with reference to FIGS. 4 and 5. The second embodiment differs from the first embodiment in that the movement inducing device according to the present invention is applied to a front passenger seat/a rear passenger seat or a furniture. Specifically, instead of applying to the vehicle seat 20, a chair is applied to the invention and such chair includes a front passenger seat/a rear passenger seat or a chair 120. The control unit 60 is embedded in a main body 111 of a movement inducing device 110.

The main body 111 includes a seat part 11a, a backrest part 11b, a headrest part 11c and a footrest part 11d. The movement inducing device 110 is provided with air bags 46 to 49 in addition to the air bags 31 through 45 (for the movement inducing device 10).

The air bags 46 and 47 are provided on the upper part of the footrest part 11d. The air bags 46 and 47 are provided with contacting portions 46a and 47a respectively, each being contactable with the right and left calves of the user M, respectively. The contacting portions 46a and 47a serve as a contacting portion respectively for inducing a movement of the intended skeletal muscle of the user M, i.e. hamstrings.

The air bags 48 and 49 are provided on the lower part of the footrest part 11d. The air bags 48 and 49 are provided with contacting portions 48a and 49a, respectively each being contactable with the right and left soles of the user M, respectively. The contacting portions 48a and 49a serve as a contacting portion respectively for inducing a movement of the intended skeletal muscle of the user M, i.e. *musculus* quadriceps femoris/*musculus* triceps surae.

The chair 120 is a chair on which the user M sits. The chair 120 includes a seat cushion 121, a seat back 122, and a leg 123. The chair 120 is used with a desk 70 as a set. The desk 70 is formed by a top plate 72 and a plurality of legs 71. The operation section 12 is arranged around the desk 70. The other components are the same as those in the first embodiment, thus, the same reference numerals are assigned correspondingly to the components to simplify the explanation.

Among the contacting portions 31a to 49a explained in the present specification, the contacting portions configured to induce a movement of a muscle for which the user M intends to exercise a muscle training are categorized as a third contacting portion A3. The third contacting portion A3 induces the movement of the muscle for which the user M intends to exercise a muscle training, and thus the user M performs the induced movement to thereby train his/her intended muscle.

Figure 6:
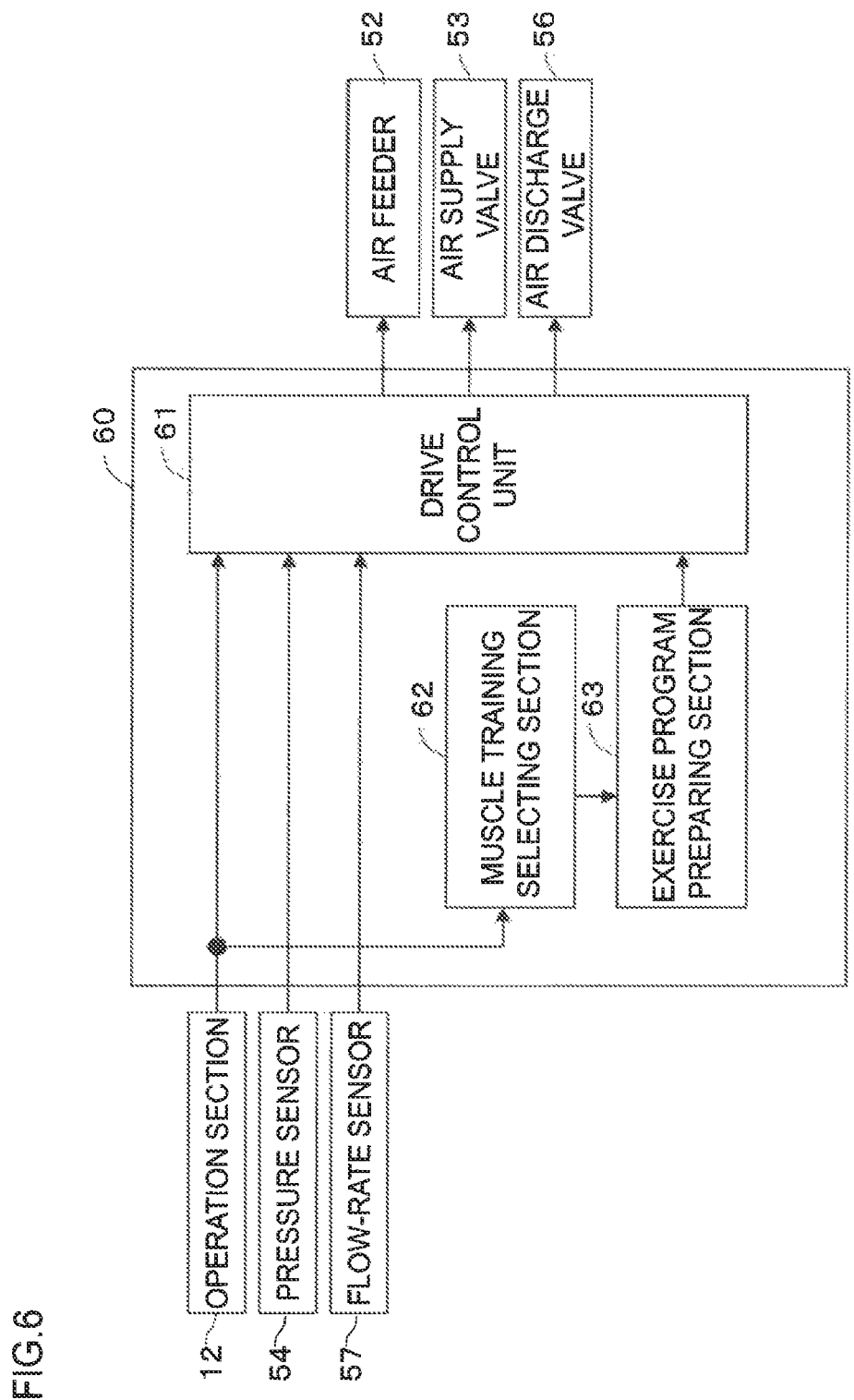
FIG. 6 is a block diagram illustrating a control unit shown in FIG. 1.

The control unit 60 includes, as shown in FIG. 6, a drive control unit 61, a muscle training selecting section 62 and an exercise program preparing section 63.

The drive control unit 61 controls driving of the drive mechanism 50 to make the intended skeletal muscle of the user M perform at least one of the isotonic muscle activity, the isometric muscle activity and the isokinetic muscle activity. Specifically, the drive control unit 61 acquires operation information from the operation section 12, an inner pressure of each of the air bags 31 through 49 from each pressure sensor 54, and a discharge rate of each of the air bags 31 through 49 from each flow-rate sensor 57, and by controlling the air feeder 52, the air supply valve 53 and the air discharge valve 56, desired expansion control, maintaining of the state of the pressure and compression control can be achieved.

In addition, the drive control unit 61 allows the operation section 12 to display a specific movement for the user M. The user M can exercise following the instructions which are displayed on the operation section 12.

The muscle training selecting section 62 selects a user-desired muscle training on the basis of the operation information from the operation section 12. The user M can select a muscle(s) desired or intended to be trained, and a training method intended to be performed for the intended muscle(s) from among the isotonic, the isometric, and the isokinetic activities. For example, when the user M selects a training menu intended for training from among muscle training menus displayed on the operation section 12, a muscle training corresponding to the selected training menu is selected. The training menus may include a menu for obtaining a better balance function, a menu for improving a walking ability, and so on.

The exercise program preparing section 63 automatically prepares an exercise program for performing the muscle training selected by the muscle training selecting section 62. The exercise program preparing section 63 can prepare the most appropriate program for the user M by grasping his/her muscle balance and/or muscle strength level on the basis of measured value of muscle strength of the user M's skeletal muscle. In addition, the muscle strength value of the user M's skeletal muscle can be calculated from the detection value obtained by the pressure sensor 54 during the training, and the calculated muscle strength can be stored.

The exercise program thus prepared is outputted to the drive control unit 61. The drive control unit 61 drives the drive mechanism 50 on the basis of the exercise program prepared by the exercise program preparing section 63 to thereby operate the third contacting portion A3.

Isotonic control which makes the skeletal muscle perform the isotonic muscle activity by the drive control unit 61 will be explained. The isotonic muscle activity is of an activity type in which the skeletal muscle exerts a force by changing the length of the skeletal muscle. In order to make the skeletal muscle perform the isotonic muscle activity, the drive control unit 61 drives the drive mechanism 50 to move the contacting portion (for example, 31a) from the initial position P0 to the first position P1 which is displaced to the user M side from the initial position, and thereafter to move the contacting portion from the first position P1 toward the initial position P0 keeping the reaction force (pressure inside the air bag) at the contacting portion within a predetermined range.

Further, isometric control which makes the skeletal muscle perform the isometric muscle activity by the drive control unit 61 will be explained. The isometric muscle activity is of an activity type in which the skeletal muscle exerts a force without changing the length of the skeletal muscle. In order to make the skeletal muscle perform the isometric muscle activity, the drive control unit 61 drives the drive mechanism 50 to move the contacting portion(s) (for example, 31a) from the initial position P0 to the first position P1 displaced to the user M side from the initial position, and then maintains the position of the contacting portion at the first position P1.

Further, Isokinetic control which makes the skeletal muscle perform the isokinetic muscle activity by the drive control unit 61 will be explained. The isokinetic muscle activity is of an activity type in which the skeletal muscle exerts a force changing the length of the skeletal muscle with a constant speed. In order to make the skeletal muscle perform the isokinetic muscle activity, the drive control unit 61 drives the drive mechanism 50 to move the contacting portion (for example, 31a) from the initial position P0 to the first position P1 which is a position displaced to the user M side from the initial position, and then move the contacting portion from the first position P1 toward the initial position P0 at a constant speed, keeping the reaction force (pressure inside the air bag) at the contacting portion within a predetermined range.

Figure 7:
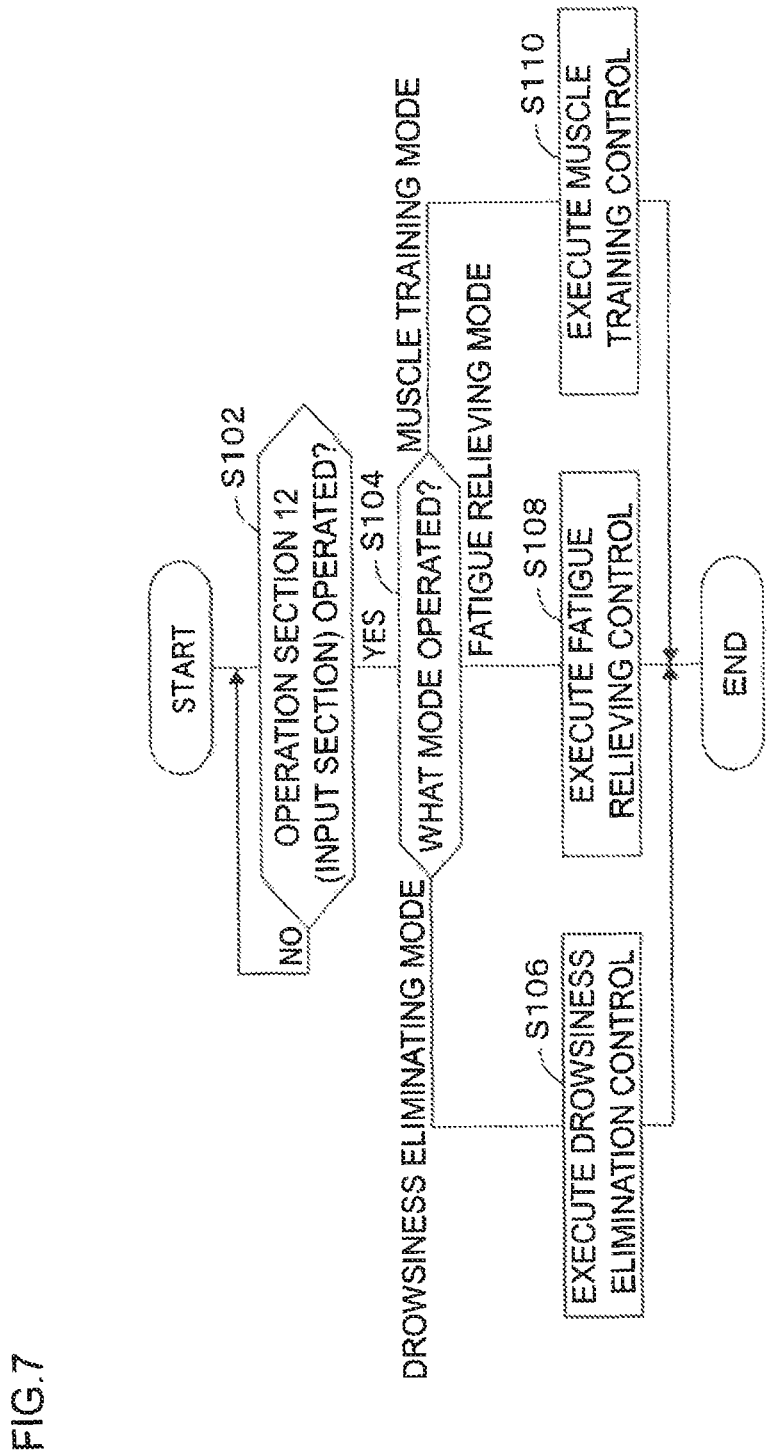
FIG. 7 is a flow chart of a control program to be executed in the control unit indicated in FIG. 1.

Next, operations of the movement inducing device 10 (110) configured as mentioned above will be explained referring to the flow chart shown in FIG. 7.

The control unit 60, in Step 102, acquires an operation state (operation information) of the operation section 12 for determination. In other words, the control unit 60 determines whether or not the operation section 12 has been under operation to select either one of a drowsiness eliminating mode, a fatigue relieving mode, and a muscle training mode. In case that none of the aforementioned modes has been selected, the control unit 60 repeatedly executes the processing in Step 102. When either one of the drowsiness eliminating mode, the fatigue relieving mode, and the muscle training mode is selected for operation, the control unit 60 executes the program to proceed to Step 104 and onwards.

In Step 104, the control unit 60 determines which one is selected from among the drowsiness eliminating mode, the fatigue relieving mode, and the muscle training mode on the basis of the operation state (operation information) of the operation section 12. When the drowsiness eliminating mode is selected, the program in the control unit 60 proceeds to Step 106. When the fatigue relieving mode is selected, the program in the control unit 60 proceeds to Step 108. When the muscle training mode is selected, the program proceeds to Step 110.

In Step 106, the control unit 60 executes drowsiness elimination control for the purpose of eliminating the drowsiness of the user M. Specifically, the control unit 60 induces the movement to activate *musculus* gluteus medius and *musculus* latissimus dorsi, which are the skeletal muscles having an effect of cerebral arousal. In other words, the control unit 60 drives the drive mechanism 50 to execute expansion control, maintenance control, and compression control for the air bags 36, 37, 44, and 45 each of which has the first contacting portion A1.

Figure 8:
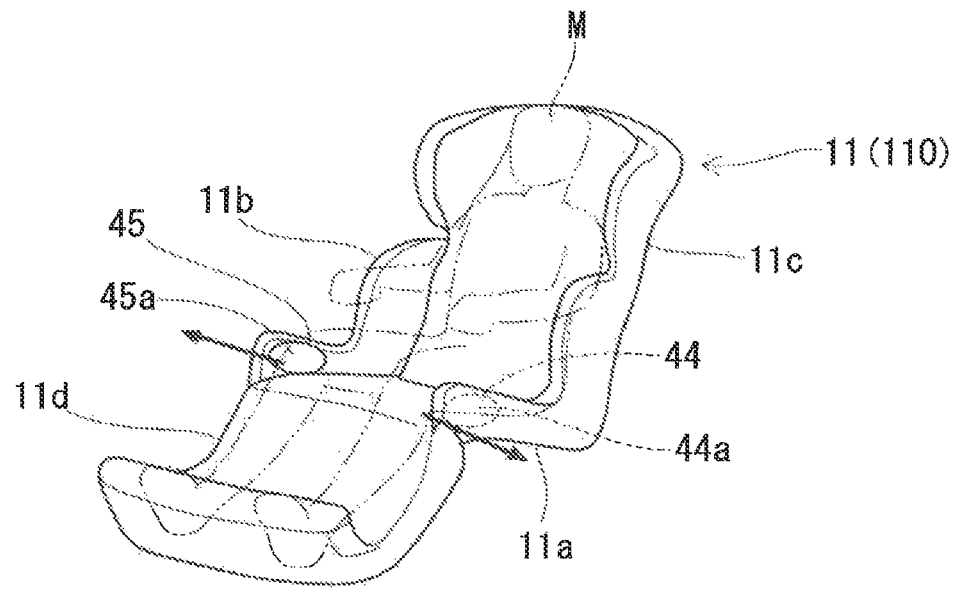
FIG. 8 is an illustration of drowsiness elimination control to be performed by the control unit indicted in FIG. 1.

In order to activate *musculus* gluteus medius, the control unit 60 controls the air bags 44 and 45 to be expanded and gives the user M an instruction to perform a motion to compress the air bags 44 and 45 using his/her thighs to thereby activate the *musculus* gluteus medius. The user M moves his/her thighs as instructed so as to compress the air bags 44 and 45 (see FIG. 8). In this case, the user M abducts his/her hip joint and thigh(s) (in the direction of the arrow shown in FIG. 8) to thereby activate *musculus* gluteus medius.

Figure 9:
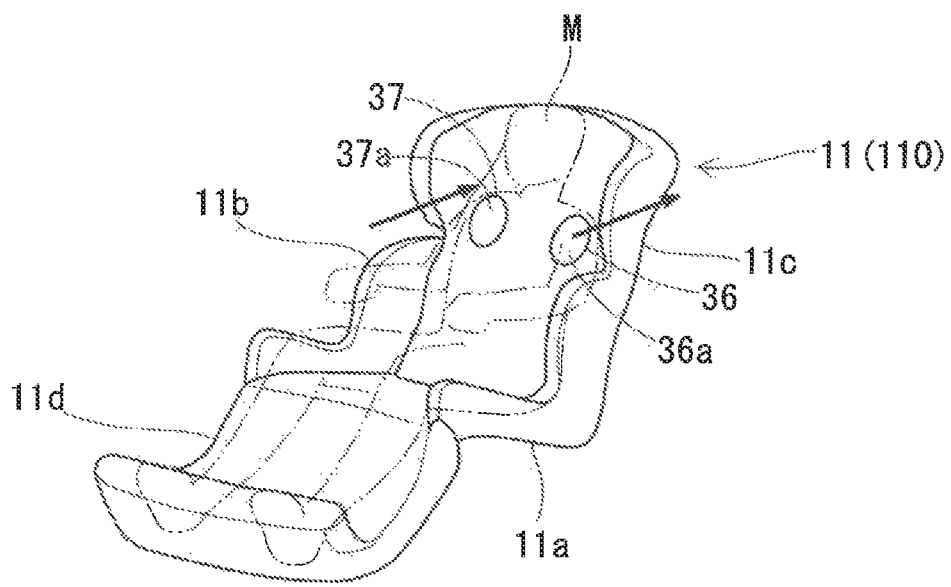
FIG. 9 is an illustration of drowsiness elimination control to be performed by the control unit indicated in FIG. 1.

In order to activate *musculus* latissimus dorsi, the control unit 60 controls the air bags 36 and 37 to be expanded and gives the user M a direction to perform a motion to compress the air bags 36 and 37 by extending his/her shoulder joints (motion of moving his/her arms backward) to thereby activate the *musculus* latissimus dorsi. The user M moves his/her arms as instructed so as to compress the air bags 36 and 37 (see FIG. 9). In this case, the user M extends his/her shoulder joints (in the direction of the arrow shown in FIG. 9) to thereby activate the *musculus* latissimus dorsi.

The control unit 60 preferably executes the isotonic control in the drowsiness elimination control. In order to make the isotonic muscle activity to be performed, the drive control unit 61 drives the drive mechanism 50 to move the contacting portion (for example, 31a) from the initial position P0 to the first position P1 which is a position displaced to the user M side from the initial position P0 and then move the contacting portion(s) from the first position P1 toward the initial position P0 while keeping the reaction force (pressure inside the air bag) at the contacting portion(s) within a predetermined range (Pr1 to Pr2).

Figure 10:
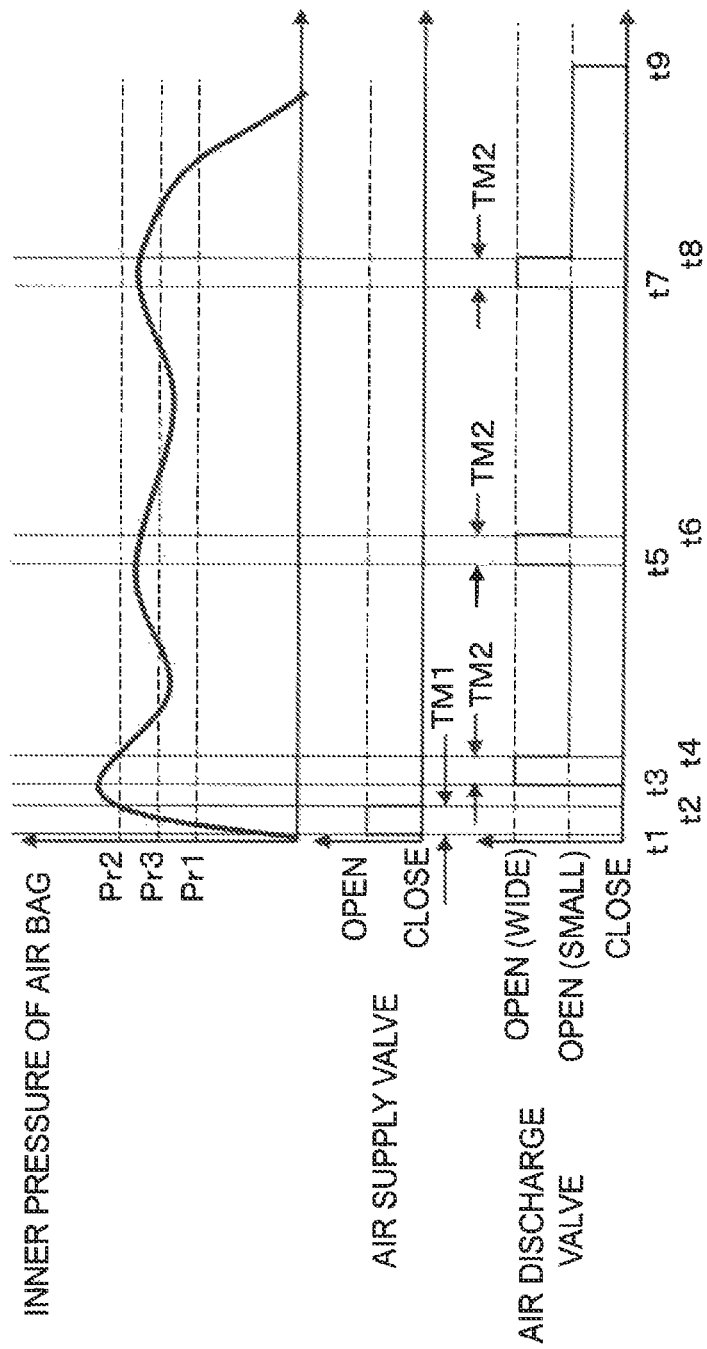
FIG. 10 is a time chart illustrating the drowsiness elimination control to be performed by the control unit indicated in FIG. 1.

More specifically, the control unit 60, as shown in FIG. 10, controls the air supply valve 53 to open at the time of starting the control (time t1), and then to close the air supply valve 53 at the time (time t2) after elapse of a predetermined time TM1. In this situation, the air feeder 52 is being operated, and the air bags 36 and 37 are continued to be supplied with air during the predetermined time TM1. The inner pressure of each air bag increases as a result.

Thereafter, at the time t3, the control unit 60 controls the air discharge valve to open (valve opening degree: large) and gives motion instructions. As a result, the air bags 36 and 37 are compressed by the user M, and thus the inner pressure of each air bag decreases. At the time (time t4) after elapse of a predetermined time TM2 from the time t3, the valve opening degree of the air discharge valve is made smaller (valve opening degree: small). The inner pressure of each air bag changes from increase to decrease, accordingly.

The control unit 60 controls the air discharge valve to open (valve opening degree: wide) at the time (time t5) after elapse of a predetermined time from the time when the inner pressure (a detection value by the pressure sensor 54) exceeds the center value Pr3 in the predetermined range (Pr1 to Pr2). The inner pressure of each air bag changes from increase to decrease, accordingly. At the time (time t6) after elapse of a predetermined time TM2 from the time t5, the valve opening degree of the air discharge valve is made smaller (valve opening degree: small). The inner pressure of each air bag changes from decrease to increase, accordingly.

The control unit 60 controls the air discharge valve to open at the time (time t7) after elapse of a predetermined time from the time when the inner pressure (a detection value by the pressure sensor 54) exceeds the center value in the predetermined range (valve opening degree: wide). The inner pressure of each air bag changes from increase to decrease, accordingly. At the time (time t8) after elapse of a predetermined time TM2 from the time t7, the valve opening degree of the air discharge valve is made smaller (valve opening degree: small). Then, when the inner pressure of the air bags reaches zero, the control unit 60 allows the air discharge valve 56 to close (time t9).

Figure 11:
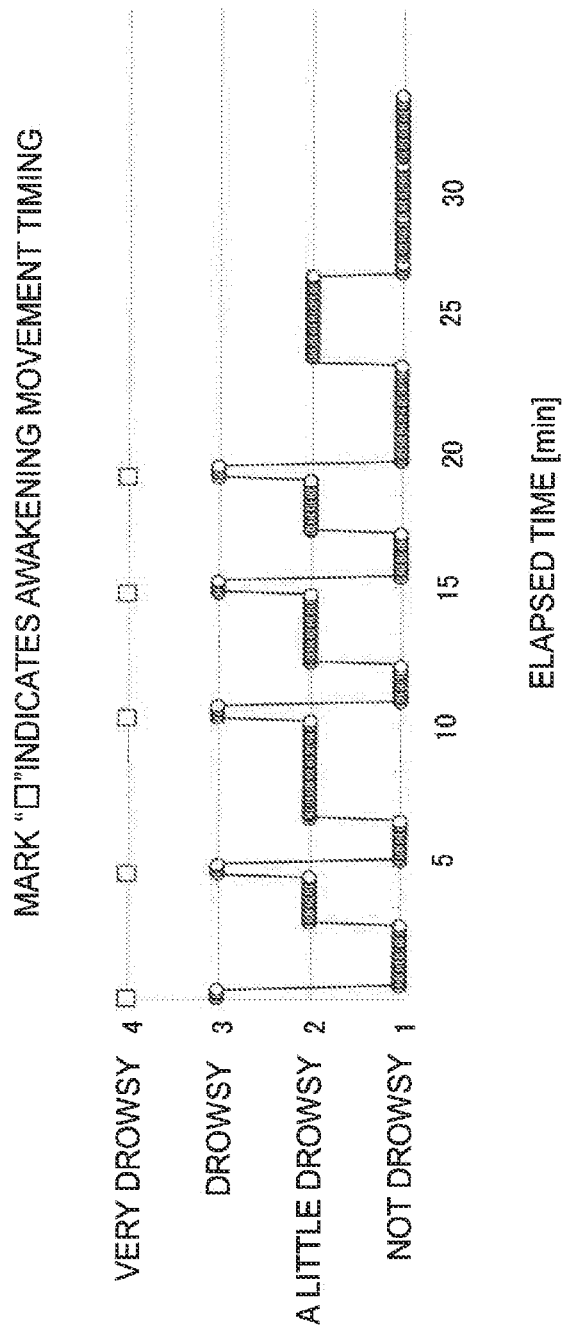
FIG. 11 is a view illustrating a drowsiness eliminating effect in the case of performing the drowsiness elimination control.

The control time is preferably set to ten and several seconds. Or, the control may also be performed at a predetermined interval. For example, as shown in FIG. 11, by repeatedly performing the control at a several minutes interval (for example, at a five minutes interval) several times, an extremely high awakening effect can be obtained.

The control unit 60, in the step S108, executes fatigue relieving control for the purpose of relieving (eliminating) the fatigue of the user M. Specifically, the control unit 60 induces the movement to activate *musculus* trapezius, *musculus* erector spinae, *musculus* triceps surae, and *musculus* quadriceps femoris, which are skeletal muscles having an influence on posture holding. *Musculus* trapezius, *musculus* erector spinae, *musculus* triceps surae, and *musculus* quadriceps femoris are muscles that suffer from fatigue caused by holding the same posture in, for example, personal computer operation, long time driving, and so on. In other word, the control unit 60 drives the drive mechanism 50 to execute the expansion control, the pressure maintenance control, and the compression control for the air bags 31 through 35, 38, 39, 40, 41, 42, 43, and 46 through 49, each of which has the second contacting portion A2 and the third contacting portion A3.

Figure 12:
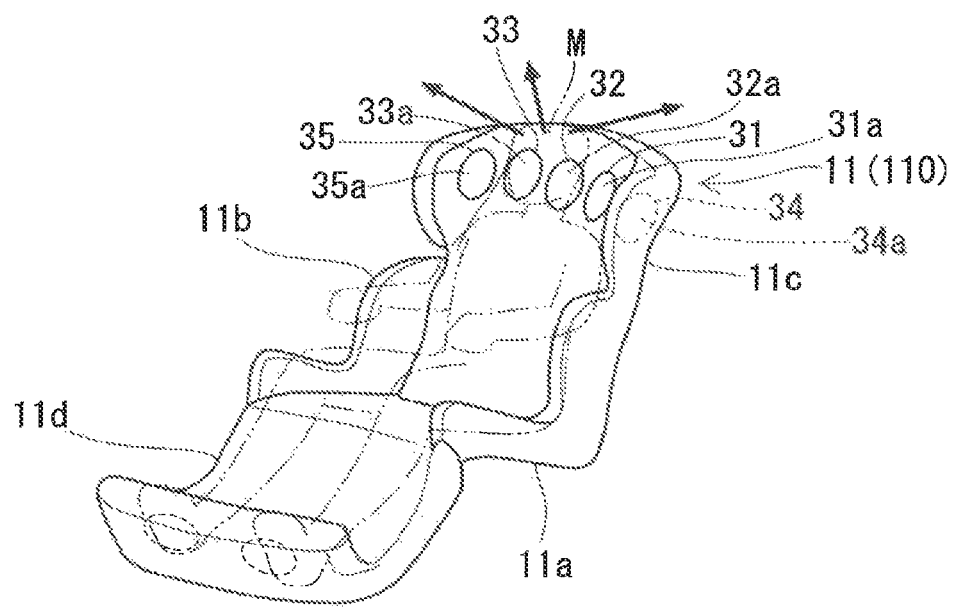
FIG. 12 is an illustration of fatigue relieving control (neck-shoulder) to be performed by the control unit indicated in FIG. 1.

The objective part of the body for fatigue relieving include, for example, fatigue of neck and shoulder, fatigue of back and waist, and fatigue of legs. To relieve the fatigue of neck and shoulder, that is, to activate *musculus* trapezius, the control unit 60 controls each of the air bags 35, 33, and 32 (or 34, 31, and 32) set laterally, diagonally, and rearward with respect to the head of the user M to expand, and gives an instruction to compress each of the air bags 35, 33, and 32 (or 34, 31, and 32) to the user M. The user M moves his/her head as instructed so as to compress each of the air bags 35, 33, and 32 (or 34, 31, and 32) (see FIG. 12). Upon receiving the instruction, the user M moves his/her head laterally, diagonally, and rearward (in the instructions of the arrows shown in FIG. 12) to thereby activate the *musculus* trapezius.

The control unit 60 preferably performs the isometric control in the fatigue relieving control. In order to make the isometric muscle activity to be performed, the drive control unit 61 drives the drive mechanism 50 to move the contacting portion(s) (for example, 31a) from the initial position P0 to the first position P1 displaced to the user M side from the initial position, and then maintain the position of the contacting portion(s) at the first position P1.

Figure 13:
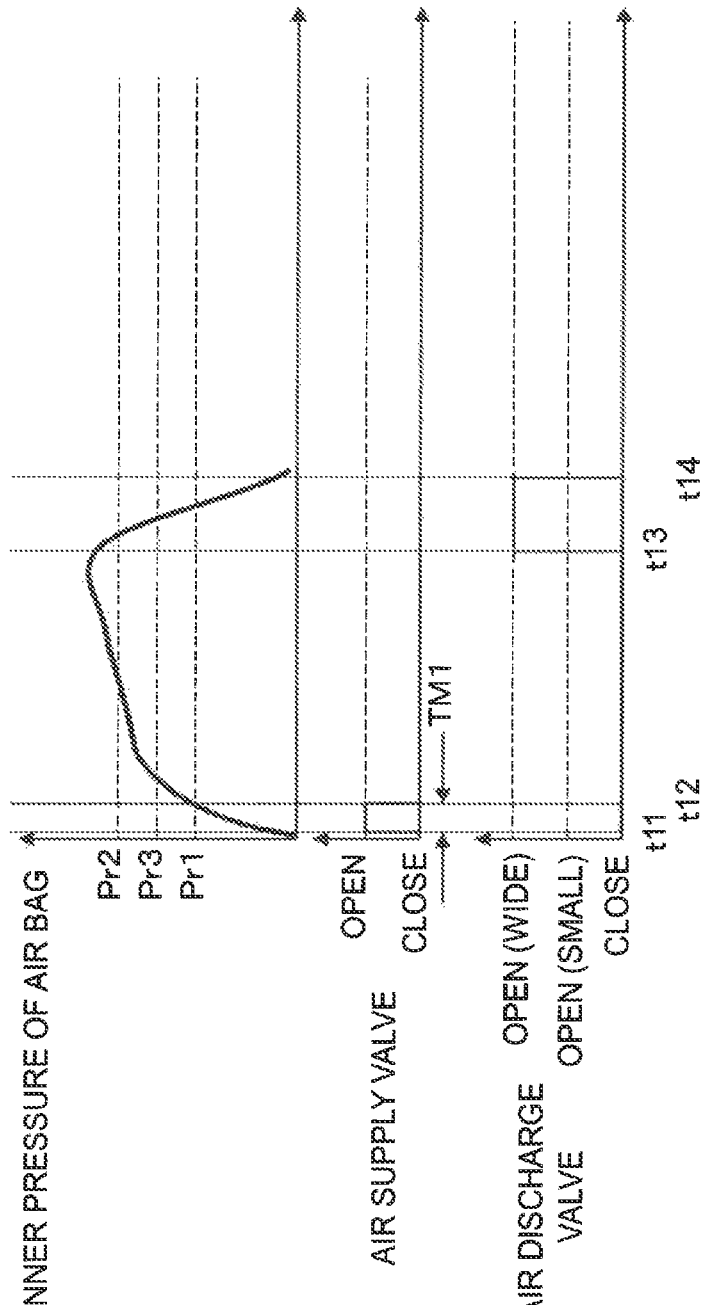
FIG. 13 is a time chart illustrating the fatigue relieving control to be performed by the control unit indicated in FIG. 1.

More specifically, the control unit 60, as shown in FIG. 13, controls the air supply valve 53 to open at the time of starting the control (time t1), and then to close the air supply valve 53 at the time (time t12) after elapse of a predetermined time TM1. In this time, the air feeder 52 is under driving, and each of the air bags 35, 33, and 32 (or 34, 31, and 32) is supplied with air during the predetermined time TM1. The inner pressure of each air bag increases accordingly.

The control unit 60 controls the air discharge valve 56 to close and gives motion instructions. As a result, each of the air bags 35, 33, and 32 (or 34, 31, and 32) is pressed by the user M, and thus the inner pressure of each air bag increases. And then, the control unit 60 controls the air discharge valve 56 to open at the time (time t13) after elapse of a predetermined time from the time when the inner pressure (a detection value by the pressure sensor 54) exceeds the predetermined range (valve opening degree: large). The inner pressure of the air bags changes from increase to decrease, accordingly. Then, when the inner pressure of each air bag reaches zero, the control unit 60 allows the air discharge valve 56 to close (time t14).

The control time is preferably set to ten and several seconds. Or, the control may also be performed at the predetermined interval. For example, by repeatedly executing the control at several minutes interval (for example, at five minutes interval) several times, an extremely high fatigue relieving effect can be obtained.

In the isometric muscle activity, a blood flow in the objective muscle is caused to be temporarily insufficient by muscular exertion (motion) (worsening a blood flow), and thus a blood flow towards the objective muscle increases after completion of the muscular exertion (after completion of the motion). Therefore, the isometric muscle activity is more effective as compared with the other muscle activities.

Further, in the upper fiber *musculus* trapezius that is a protagonist for the rearward motion of the head, acting fibers are different in the lateral, diagonal, and rearward directions. Therefore, it is important to move the muscles in the plural directions. Inducing the motions in the plural directions makes it possible to cause a congener in connection with each motion direction exercise in addition to the protagonist, thus further higher fatigue relieving effect can be obtained.

Still further, the motion direction can be easily adjusted to, for example, the lateral direction, the diagonal direction, and the rearward direction only by switching the air bag(s) to be expanded, and thus the fatigue relieving effect can be more effectively obtained.

Figure 14:
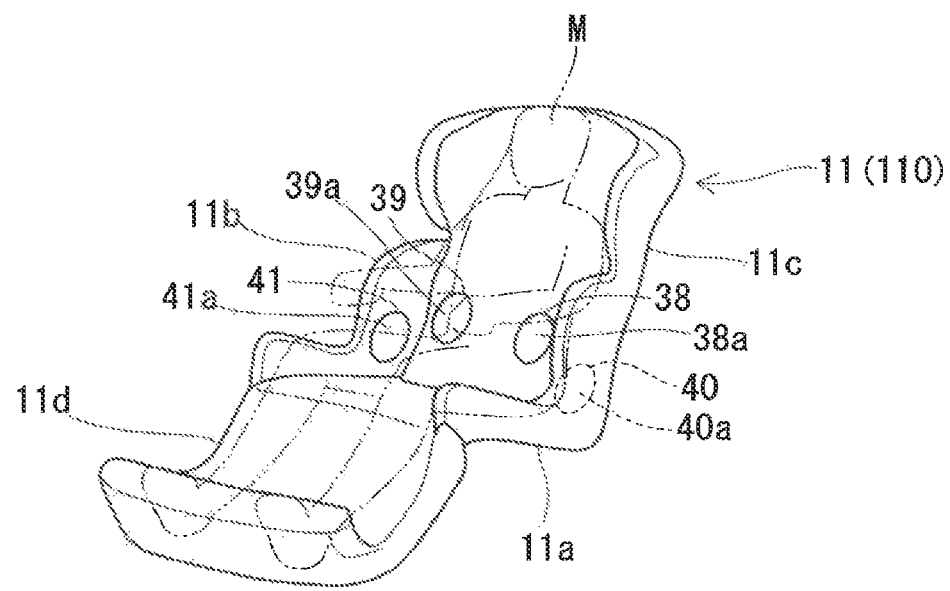
FIG. 14 is an illustration of fatigue relieving control (back) to be performed by the control unit indicated in FIG. 1.

In order to relieve the fatigue on the back/waist, that is, in order to activate *musculus* erector spinae, the control unit 60 controls one of the air bags 38 and 39 set on the back of the waist to be expanded, and gives the user M an instruction to compress the expanded one of the air bags 38 and 39 by the motion of twisting his/her trunk. The user M compresses the expanded one of the air bags 38 and 39 by the motion of twisting his/her trunk as instructed (see FIG. 14). The other one of the air bags 38 and 39 is controlled in the similar way. In this case, the user M allows his/her *musculus* erector spinae to activate by twisting his/her trunk.

Alternately, the control unit 60 controls one of the air bags 40 and 41 set on the left and right of the hips to be expanded, and gives the user M an instruction to compress the expanded one of the air bags 40 and 41 by the motion of moving his/her hip in the lateral direction. The user M compresses the expanded one of the air bags 40 and 41 by the motion of moving his/her hip in the lateral direction (see FIG. 14). The other one of the air bags 40 and 41 is controlled in the similar way. In this case, the user M allows his/her *musculus* erector spinae to activate by moving his/her hip in the lateral direction.

The control unit 60 preferably executes the isometric muscle control for fatigue relieving control.

Figure 15:
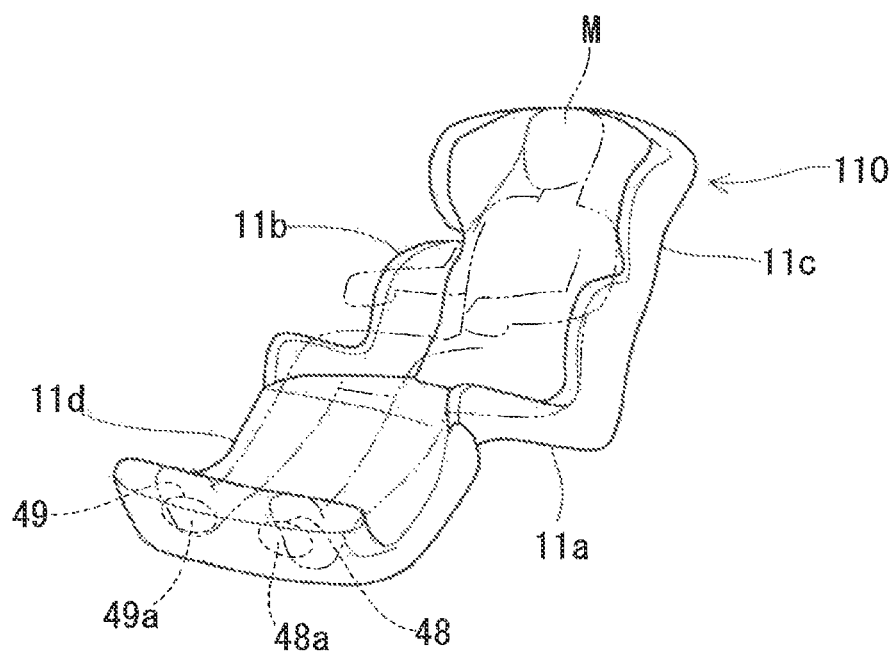
FIG. 15 is an illustration of fatigue relieving control (legs) to be performed by the control unit indicated in FIG. 1.

In order to relieve the fatigue on the leg(s), that is, in order to activate *musculus* triceps surae and *musculus* quadriceps femoris, the control unit 60 controls the air bags 48 and 49 set on the soles to be expanded, and gives the user M an instruction to compress the expanded air bags 48 and 49 by the motion of plantar flexion (extending his/her ankles) or extension of his/her feet (extending his/her knees). The user M compresses the expanded air bags 48 and 49 by the motion of extending his/her ankles or extending his/her knees as instructed (see FIG. 15). In this case, the user M allows his/her *musculus* triceps surae and *musculus* quadriceps femoris to activate by extending his/her ankles or extending his/her knees.

The control unit 60 preferably executes the isometric muscle control for fatigue relieving control.

The control unit 60, in the step S110, executes muscle training control for the purpose of training the muscle strength of the user M (hereinafter referred to as muscle training). Specifically, the control unit 60 induces the movement to activate the skeletal muscles selected by the user M. In other words, the control unit 60 drives the drive mechanism 50 to execute the expansion control, the maintenance control, and the compression control for the intended ones among the air bags 31 through 49, each of which has the third contacting portion A3.

In order to activate the skeletal muscles selected by the user M, the control unit 60 controls the intended one(s) among the air bags 31 through 49 to be expanded for the user M to perform an appropriate motion so as to activate the muscle(s) selected by the user M, and gives the user M an instruction to compress the corresponding air bag(s). The user M compresses the air bag(s) as instructed. In this case, the user M allows his/her selected skeletal muscles to activate by performing the motion appropriate for activating his/her selected muscle(s).

The control unit 60 preferably executes at least one of isotonic control, isometric control, and isokinetic control in muscle training control. Selection of the control from among the isotonic control, the isometric control, and the isokinetic control may be made by the user M, or automatically made by the control unit 60.

The control unit 60 preferably drives the drive mechanism 50 on the basis of the exercise program prepared by the exercise program preparing section 63 to thereby operate the third contacting portion A3.

As apparent from the aforementioned embodiment, the movement inducing device 10 (110) according to the present embodiment is provided between the chair 20 (120) on which the user M sits and the user M with being in contact with the user M, and is provided with a plurality of the air bags 31 through 49 having the contacting portions 31a to 49a for inducing the motion of the skeletal muscles intended by the user M, respectively, the drive mechanism 50 that can move the contacting portions 31a through 49a to the user M side or the side opposite to the user M, or/and can control the reaction force generated against the pressing force by the user M at each of the contacting portions 31a through 49a by adjusting the supply and discharge of the air to and from each of the air bags 31 through 49; and the control unit 60 including the drive control unit 61 that controls driving of the drive mechanism 50 to make the skeletal muscles intended by the user M perform at least one of the isotonic muscle activity, the isometric muscle activity, and the isokinetic muscle activity.

According to such configuration, the drive control unit 61 controls driving of the drive mechanism 50 to thereby control the contacting portions 31a through 49a of the air bags 31 through 49, and controls the skeletal muscles intended by the user M to perform at least one of the isotonic muscle activity, the isometric muscle activity, and the isokinetic muscle activity. In this way, a movement of the objective skeletal muscles of the user M can be appropriately induced by controlling the air bags 31 through 49 with a relatively simple structure. Consequently, it is possible to provide the movement inducing device 10 which is small in size and low in cost and with favorable user convenience and operability.

The contacting portions 36a, 37a, 44a, and 45a are defined as the first contacting portion A1 for inducing a movement of *musculus* gluteus medius and *musculus* latissimus dorsi.

According to such configuration, the movement inducing device 10 can induce the movement of *musculus* gluteus medius and *musculus* latissimus dorsi having a high cerebral arousal effect. Thus, when the user M intends to attain an effective cerebral arousal, a movement that makes it possible to attain the cerebral arousal effect can be appropriately induced.

The contacting portions 31a through 35a, 38a, 39a, 40a, 41a, 42a, 43a, and 46a through 49a are defined as the second contacting portion A2 for inducing movement of *musculus* trapezius, *musculus* erector spinae, *musculus* gluteus maximus/hamstrings, the *musculus* triceps surae and the *musculus* quadriceps femoris.

According to such configuration, with the purpose of fatigue relieving, the movement inducing device 10 can induce the movement of *musculus* trapezius, *musculus* erector spinae, *musculus* triceps surae and *musculus* quadriceps femoris which require the fatigue relieving. Thus, when the user M intends for fatigue relieving, a movement that makes it possible to attain the fatigue relieving effect can be induced appropriately.

The contacting portions 31a through 49a are defined as the third contacting portion A3 for inducing movement of muscle(s) intended for muscle training by the user M.

According to such configuration, the movement inducing device 10 can induce the movement to perform appropriate muscle training for the muscle(s) intended for muscle training by the user M. Thus, when the user M intends to perform muscle training, a movement that makes it possible to obtain the muscle training effect can be induced appropriately.

The control unit 60 includes the muscle training selecting section 62 configured to select the muscle training intended by the user M; and the exercise program preparing section 63 configured to prepare an exercise program for achieving the muscle training selected by the muscle training selecting section 62, and the drive control unit 61 drives the drive mechanism 50 on the basis of the exercise program prepared by the exercise program preparing section 63 thereby operating the third contacting portions 31a through 49a.

According to such configuration, the movement inducing device 10 enables the user M to appropriately perform the intended muscle training, improving the user M's convenience.

In order to make the isotonic muscle activity to be performed, the drive control unit 61 drives the drive mechanism 50 to move the contacting portions 31a to 49a from the initial position P0 to the first position P1 which is a position displaced to the user M side from the initial position, and then to move the contacting portions 31a through 49a from the first position P1 toward the initial position P0 while keeping the reaction force at the contacting portions 31a through 49a within a predetermined range.

According to such configuration, the movement inducing device 10 can make the skeletal muscles intended by the user M appropriately perform the isotonic muscle activity.

In order to make the isometric muscle activity to be performed, the drive control unit 61 drives the drive mechanism 50 to move the contacting portions 31a through 49a from the initial position P0 to the first position P1 which is a position displaced to the user M side from the initial position, and then maintain the position of the contacting portions 31a through 49a at the first position P1. According to such configuration, the movement inducing device 10 can make the skeletal muscles intended by the user M appropriately perform the isometric muscle activity.

In order to make the isokinetic muscle activity to be performed, the drive control unit 61 drives the drive mechanism 50 to move the contacting portions 31a through 49a from the initial position P0 to the first position P1 which is a position displaced to the user M side from the initial position, and then to move the contacting portions 31a through 49a from the first position P1 toward the initial position P0 at a constant speed while keeping the reaction force at the contacting portions 31a through 49a within a predetermined range.

According to such configuration, the movement inducing device 10 can make the skeletal muscles intended by the user M appropriately perform the isokinetic muscle activity.

REFERENCE SIGNS LIST 10, 110; movement inducing device 11, 111; main body 20, 120; vehicle seat (chair), 31 through 49; air bags 31a to 49a, contacting portions; 50; drive mechanism 60; control unit 61; drive control unit 62; muscle training selecting section 63; exercise program preparing section A; vehicle M; driver, user.

The invention claimed is:

1. A movement inducing device comprising:
a plurality of air bags, each being provided with a contacting portion configured to contact with a user and induce a movement of an intended skeletal muscle of the user;
a drive mechanism configured to expand and compress the air bags by adjusting supply and discharge of air to and from each air bag; and
a control unit provided with a drive control unit configured to control driving of the drive mechanism to make the intended skeletal muscle of the user perform at least one of an isotonic muscle activity, an isometric muscle activity and an isokinetic muscle activity by executing an expansion control which controls an expansion of each air bag, a maintenance control which controls a maintenance of the contacting portion to a position displaced to a user side, and a compression control which controls a compression of each air bag,
wherein, during compression control, the control unit is configured to instruct the user to perform a motion to compress each air bag which induces the movement of the intended skeletal muscle of the user, and each air bag is compressed by the user performing the motion to compress as instructed by the control unit.

2. The movement inducing device according to claim 1, wherein
the contacting portion comprises a first contacting portion configured to induce a movement of musculus gluteus medius and musculus latissimus dorsi of the user.

3. The movement inducing device according to claim 1, wherein
the contacting portion comprises a second contacting portion configured to induce a movement of musculus trapezius, musculus erector spinae, musculus gluteus maximus, musculus triceps surae and musculus quadriceps femoris of the user.

4. The movement inducing device according to claim 1, wherein
the contacting portion comprises a third contacting portion configured to induce a movement of a muscle for which the user intends to perform a muscle training.

5. The movement inducing device according to claim 4, wherein
the control unit comprises:
a muscle training selecting section configured to select the muscle training intended by the user; and
an exercise program preparing section configured to prepare an exercise program for performing the muscle training selected by the muscle training selecting section, and wherein, the drive control unit drives the drive mechanism on the basis of the exercise program prepared by the exercise program preparing section to operate the third contacting portion.

6. The movement inducing device according to claim 1, wherein
in order to perform the isotonic muscle activity, the drive control unit drives the drive mechanism to move the contacting portion from an initial position to a first position which is a position displaced to a user side from the initial position and thereafter to move the contacting portion from the first position toward the initial position, keeping a reaction force at the contacting portion within a predetermined range.

7. The movement inducing device according to claim 1, wherein
in order to perform the isometric muscle activity, the drive control unit drives the drive mechanism to move the contacting portion from an initial position to a first position which is a position displaced to a user side from the initial position and thereafter to hold the contacting portion at the first position.

8. The movement inducing device according to claim 1, wherein
in order to perform the isokinetic muscle activity, the drive control unit drives the drive mechanism to move the contacting portion from an initial position to a first position which is a position displaced to a user side from the initial position and thereafter to move the contacting portion from the first position toward the initial position at a constant speed, keeping a reaction force at the contacting portion within a predetermined range.

9. The movement inducing device according to claim 1, wherein
the drive control unit performs at least one of the isotonic muscle activity and the isometric muscle activity multiple times at a predetermined interval.

10. The movement inducing device according to claim 1, wherein
the movement inducing device is provided on a vehicle seat.

* * * * *